(12) United States Patent
Liu et al.

(10) Patent No.: US 9,112,775 B2
(45) Date of Patent: Aug. 18, 2015

(54) METHOD AND DEVICE FOR ESTABLISHING BACKUP PATH, METHOD AND DEVICE FOR SELECTING BACKUP PATH

(71) Applicant: Huawei Technologies Co., Ltd., Shenzhen, Guangdong (CN)

(72) Inventors: Tao Liu, Shenzhen (CN); Guangdong Zhu, Shenzhen (CN); Hua Tan, Shenzhen (CN); Tao Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 13/925,234

(22) Filed: Jun. 24, 2013

(65) Prior Publication Data

US 2013/0286822 A1 Oct. 31, 2013

Related U.S. Application Data

(63) Continuation of application No. PCT/CN2011/083509, filed on Dec. 6, 2011.

(30) Foreign Application Priority Data

Dec. 24, 2010 (CN) .......................... 2010 1 0615004

(51) Int. Cl.
*H04W 4/00* (2009.01)
*H04L 12/24* (2006.01)
(Continued)

(52) U.S. Cl.
CPC ........ *H04L 41/0654* (2013.01); *H04L 41/0663* (2013.01); *H04L 45/22* (2013.01); *H04L 45/04* (2013.01); *H04L 45/28* (2013.01)

(58) Field of Classification Search
None
See application file for complete search history.

(56) References Cited

U.S. PATENT DOCUMENTS

2002/0131424 A1    9/2002  Suemura
2004/0218923 A1*  11/2004  Ozugur et al. .................. 398/57
(Continued)

FOREIGN PATENT DOCUMENTS

CN         1863135 A    11/2006
CN       101192961 A     6/2008
(Continued)

OTHER PUBLICATIONS

International Search Report in corresponding Patent Application No. PCT/CN2011/083509 (Mar. 15, 2012).
(Continued)

*Primary Examiner* — Kodzovi Acolatse
(74) *Attorney, Agent, or Firm* — Leydig, Voit & Mayer, Ltd.

(57) ABSTRACT

Embodiments of the present disclosure provide a method and device for establishing backup path, a method and device for selecting backup path. The method comprises a first node in a first IGP domain receiving a response message of successful establishment of a main path from a second node in a second IGP domain through the main path; the first node obtains path information of the main path from the response message; the path information of the main path includes at least SRLG information of a link composing the main path; the first node establishes, according to the path information of the main path, a backup path between the first node and the second node; the SRLG information of a link composing the backup path is different from the SRLG information of the link composing the main path.

8 Claims, 5 Drawing Sheets

(51) Int. Cl.
*H04L 12/707* (2013.01)
*H04L 12/703* (2013.01)
*H04L 12/715* (2013.01)

(56) References Cited

U.S. PATENT DOCUMENTS

| | | |
|---|---|---|
| 2006/0002291 A1 | 1/2006 | Alicherry et al. |
| 2006/0083251 A1 | 4/2006 | Kataoka et al. |
| 2006/0114818 A1* | 6/2006 | Canali et al. ............... 370/216 |
| 2006/0133265 A1* | 6/2006 | Lee ............... 370/228 |
| 2006/0140190 A1* | 6/2006 | Lee ............... 370/395.3 |
| 2007/0091795 A1 | 4/2007 | Bonavenure et al. |
| 2009/0103442 A1 | 4/2009 | Douville |
| 2010/0067532 A1 | 3/2010 | Kumaki et al. |
| 2010/0208722 A1 | 8/2010 | Nishioka et al. |

FOREIGN PATENT DOCUMENTS

| | | |
|---|---|---|
| CN | 101227377 A | 7/2008 |
| EP | 1675326 A1 | 6/2006 |
| JP | 2006121249 A | 5/2006 |
| JP | 2009200663 A | 9/2009 |
| JP | 2009232321 A | 10/2009 |
| WO | 2008123063 A1 | 10/2008 |
| WO | 2009051215 A1 | 4/2009 |

OTHER PUBLICATIONS

Written Opinion in corresponding Patent Application No. PCT/CN2011/085309 (Mar. 15, 2012).

Ogino et al., "An Inter-Domain Path Computation Scheme Adaptive to Traffic Load in Domains," IEICE Trans. Commun., vol. E93-B, No. 4, The Institute of Electronics, Information and Communication Engineers (Apr. 2010).

Chen, "The LSP Protection/Restoration Mechanism in GMPLS," University of Ottawa, Ontario, Canada (Oct. 1, 2002).

Zhang et al., "RSVP-TE Extensions for Configuration SRLG of an FA," Internet draft, draft-zhang-ccamp-srlg-fa-configuration-00.txt, Network Working Group, IETF (Jul. 5, 2010).

Zhang et al., "RSVP-TE Extensions for Configuration SRLG of an FA," Internet draft, draft-zhang-ccamp-srlg-fa-configuration-01.txt, Network Working Group, IETF (Oct. 20, 2010).

Awduche et al., "RSVP-TE: Extensions to RSVP for LSP Tunnels," Memo, RFC 3209, Network Working Group, The Internet Society (Dec. 2001).

Pan et al., "Fast Reroute Extensions to RSVP-TE for LSP Tunnels," Memo, RFC 4090, Network Working Group, The Internet Society (May 2005).

* cited by examiner

|      Type       |     Length      |      Flags      |     C-Type      |

METHOD AND DEVICE FOR ESTABLISHING BACKUP PATH, METHOD AND DEVICE FOR SELECTING BACKUP PATH

CROSS-REFERENCE TO RELATED APPLICATIONS

This application is a continuation of International Patent Application No. PCT/CN2011/083509, filed on Dec. 6, 2011, which claims priority to Chinese Patent Application No. 201010615004.2, filed on Dec. 24, 2010, both of which are hereby incorporated by reference in their entireties.

FIELD OF THE INVENTION

Embodiments of the present invention relate to communication technologies, and more particularly, to a method and device for establishing backup path, a method and device for selecting backup path.

BACKGROUND OF THE INVENTION

In Internet protocol (hereinafter referred to as IP)/Multi-protocol Label Switching (hereinafter referred to as MPLS) network of data communications, after an MPLS Label-Switched Path (hereinafter referred to as LSP) between two Label-Switch Routers (hereinafter referred to as LSR) is established, if the links or node passed by LSP failed, communication link interruption and loss of user data will be caused. This kind of simple LSP can not satisfy user's requirements if the user has higher requirements on reliability of transmitted data.

In the art, in order to provide higher reliability to user data, end-to-end protection mode and Fast Reroute (hereinafter referred to as FRR) mode are usually adopted to ensure the reliability of the user data. The end-to-end protection mode, also known as path backup, realizes the whole protection from ingress node to egress node of LSP. When a failure on a main LSP is detected, the protection of the service data is realized through switching to a backup LSP or rebuilding a new backup LSP. FRR mode protects a link or a node passed by a main LSP by building a backup LSP in advance. When a failure on the protected link or node is detected, the flow on the main path is switched to the backup path to realize the protection of service data.

When the protection is performed using the above two protection modes, the relationship between the backup path and the main path needs to be considered to avoid that the backup path and the main path choose the same link. But in practical network, the main path and the backup path usually belong to the same interface group or the same equipment room, and when the main path fails, it is highly likely that the backup path fails as well. Based on this technical problem, Shared Risk Link Groups (hereinafter referred to as SRLG) information is used in the art. While a user assigns same SRLG information to two links, the two links are identified that they take the same risk and might be interrupted at the same time when encountering a failure. Therefore, when a protection path is selected, the other link should be ruled out. In this way, in practical networking, in order to get rid of, according to SRLG information, the links which take the shared risk, the path information in the Interior Gateway Protocols (hereinafter referred to as IGP) domain can be obtained according to the protocol of Constrained Shortest Path First (hereinafter referred to as CSPF), and the computation is performed according to the SRLG information configured by the user, thereby establishing the best backup path.

However, the technical solution in the art, which computes and establishes the best backup path according to the SRLG information, is applied to obtain the best backup path in an IGP domain. Since the path information of other domains can not be obtained, the above-mentioned technical solution can not be applied to obtain the best backup path under the cross-IGP domain scenario, which leads to lower safety of user data under the cross domain scenario.

SUMMARY OF THE INVENTION

The present disclosure provides a method and device for establishing backup path, a method and device for selecting backup path, to resolve the problem of low safety of user data under the cross-IGP domain scenario in the art, which can effectively reduce the risk of failure under the cross-IGP domain scenario, and improves the safety of user data.

In one aspect, the present disclosure provides a method for establishing backup path, comprising:

receiving, by a first node in a first Internal Gateway Protocol domain, a response message of successful establishment of a main path returned by a second node in a second Internal Gateway Protocol domain through the main path, where the second Internal Gateway Protocol domain is a neighbor of the first Internal Gateway Protocol domain;

obtaining, by the first node, path information of the main path from the response message of successful establishment of the main path, where the path information of the main path includes at least Shared Risk Link Groups information of a link composing the main path; and establishing, by the first node, a backup path between the first node and the second node according to the path information of the main path, where the Shared Risk Link Groups information of a link composing the backup path is different from the Shared Risk Link Groups information of the link composing the main path.

In the other aspect, the present disclosure provides a method for selecting backup path, comprising:

receiving, by a first node in a first Internal Gateway Protocol domain, a response message of successful establishment of a main path returned by a second node in a second Internal Gateway Protocol domain through the main path, and obtaining path information of the main path from the response message of successful establishment of the main path;

receiving, by the first node, through at least two candidate backup paths, at least two response messages of successful establishment of candidate backup paths returned by the second node, respectively, and obtaining path information of the candidate backup paths from the response messages of successful establishment of candidate backup paths; and selecting, by the first node, a backup path according to the obtained path information of the main path and the path information of the candidate backup paths, where the Shared Risk Link Groups information of a link composing the backup path is different from the Shared Risk Link Groups information of a link composing the main path.

In one aspect, the present disclosure provides a device for establishing backup path, located in a first Internal Gateway Protocol domain, comprising:

a first receiving module, configured to receive a response message of successful establishment of a main path returned by a second node in a second Internal Gateway Protocol domain through the main path, where the second Internal Gateway Protocol domain is a neighbor of the first Internal Gateway Protocol domain;

a first obtaining module, configured to obtain path information of the main path from the response message of successful establishment of the main path, where the path information of the main path includes at least Shared Risk Link Groups information of a link composing the main path; and an establishing module, configured to establish, according to the path information of the main path, a backup path between the device for establishing backup path and the second node, where the Shared Risk Link Groups information of a link composing the backup path is different from the Shared Risk Link Groups information of a link composing the main path.

In the other aspect, the present disclosure also provides a device for selecting backup path, located in a first Internal Gateway Protocol domain, comprising:

a second receiving module, configured to receive a response message of successful establishment of a main path, from a second node in a second Internal Gateway Protocol domain through the main path, and obtain path information of the main path from the response message of successful establishment of the main path, where the second Internal Gateway Protocol domain is a neighbor of the first Internal Gateway Protocol domain;

a third receiving module, configured to receive, through at least two candidate backup paths, at least two response messages of successful establishment of candidate backup paths returned by the second node, respectively, and obtain path information of the candidate backup paths from the response messages of successful establishment of candidate backup paths; and a selecting module, configured to select a backup path according to the path information of the main path obtained by the second receiving module and the path information of the candidate backup paths obtained by the third receiving module, where the Shared Risk Link Groups information of a link composing the backup path is different from the Shared Risk Link Groups information of a link composing the main path.

Method and device for establishing backup path, method and device for selecting backup path in the present disclosure, establish or select a backup path, wherein, the SRLG information of a link composing the backup path is different from the SRLG information of a link composing the main path. The best backup path can be obtained under the cross-IGP domain scenario when the technical solutions in the embodiments of the present disclosure are adopted, which effectively reduces the risk of failure under the cross-IGP domain scenario, that is, reducing the probability of the risk that the backup path and the main path have the same failures to the bottom level, and thereby effectively improving the safety of user data.

BRIEF DESCRIPTION OF THE DRAWINGS

In order to describe the technical solutions in the embodiments of the present disclosure or the art more clearly, a brief introduction on the accompanying drawings which are needed in the description of the embodiments or the art are given below. Apparently, the accompanying drawings in the description below are merely some of the embodiments of the present disclosure, based on which other drawings can be obtained by those skilled in the art without any creative effort.

DETAILED DESCRIPTION OF THE INVENTION

In order to make objectives, technical solutions and advantages of the present disclosure more clearly, a detailed description of the embodiments of the present disclosure will be given below in connection with the accompanying drawings. Apparently, the described embodiments are only a part, but not all, of the embodiments of the present disclosure. All of the other embodiments that are obtained by those skilled in the art based on the embodiments in the disclosure without any inventive efforts fall into the scope protected by the present disclosure.

Figure 1:
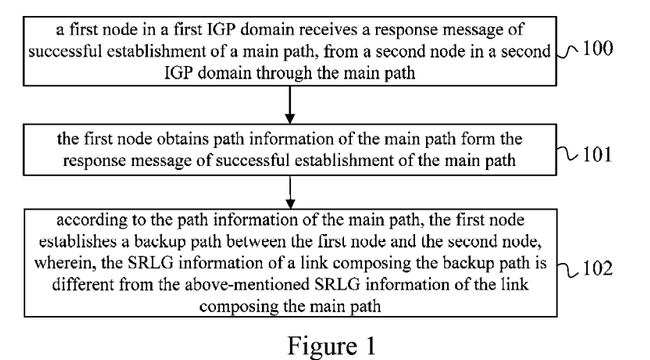
FIG. 1 is a flowchart of a method for establishing backup path provided by embodiment 1 of the present disclosure.

FIG. 1 is a flowchart of a method for establishing backup path provided by embodiment 1 of the present disclosure. As shown in FIG. 1, a method for establishing backup path of present embodiment comprises:

100: A first node in a first IGP domain receives a response message of successful establishment of a main path, from a second node in a second IGP domain through the main path; wherein the first IGP domain is a neighbor of the second IGP domain.

The path information of the main path, which includes at least the SRLG information of a link composing the main path, is carried in the above-mentioned response message of successful establishment of the main path.

Optionally, the above-mentioned response message of successful establishment of the main path may further include an address of the second node.

Further optionally, the response message of successful establishment of the main path may further include an address of a boundary node, through which the main path pass and an identifier of the link composing the main path.

Optionally, the above-mentioned first node can be a head node, or can be a Point of Local Repair (hereinafter referred to as PLR).

101: The first node obtains path information of the main path form the response message of successful establishment of the main path.

In this embodiment, SRLG information of a link represents the risk identification of this link in the network, which can be set by the operator when the network is configured. For example, in the same network, when two links have the same SRLG information, these two links have the same level of risk of failure. In the scenario described by the embodiment, since the main path spans from the first IGP domain to the second IGP domain, the link composing the main path includes at least two links: a link from the first node in the first IGP domain to the boundary node and a link from the boundary node to the second node in the second IGP domain.

102: According to the path information of the main path, the first node establishes a backup path between the first node and the second node, wherein, the SRLG information of a link composing the backup path is different from the above-mentioned SRLG information of the link composing the main path.

The method for establishing backup path in the present embodiment, establishes a backup path according to the SRLG information of the link composing the main path, wherein, the SRLG information of the link composing the backup path is different from the SRLG information of the link composing the main path. The problem that the backup path cannot be established according to the computation of SRLG information under the cross-IGP domain scenario in the art is solved when the technical solution of the embodiments of the present disclosure is adopted. The best backup path is obtained under the scenario of cross-IGP domain, thereby reducing the risk of failure under the scenario of cross-IGP domain and reducing the probability of risk that the backup path and main path have the same failures to bottom level, so that the safety of user data can be improved efficiently.

Figure 2:
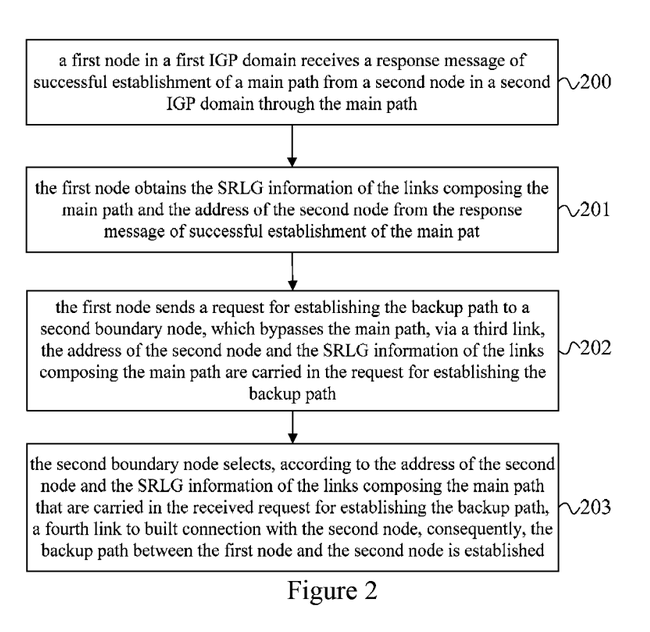
FIG. 2 is a flowchart of a method for establishing backup path provided by embodiment 2 of the present disclosure.

FIG. 2 is a flowchart of a method for establishing backup path provided by embodiment 2 of the present disclosure. As shown in FIG. 2, the method for establishing backup path of present embodiment comprises:

200: A first node in a first IGP domain receives a response message of successful establishment of a main path from a second node in a second IGP domain through the main path; wherein the second IGP domain is a neighbor of the first IGP domain.

Optionally, in the present embodiment, main path includes a first link from the first node to the first boundary node and a second link from the first boundary node to the second node.

201: The first node obtains the SRLG information of the links composing the main path and the address of the second node from the response message of successful establishment of the main path.

Optionally, in the present embodiment, the first node establishes a backup path between the first node and the second node according to the path information of the main path, comprising:

202: When SRLG information of at least one link is different from the SRLG information of the links composing the main path, the first node sends a request for establishing the backup path to a second boundary node, which bypasses the main path, via a third link, the address of the second node and the SRLG information of the links composing the main path are carried in the request for establishing the backup path; wherein, the SRLG information of the third link is different from the SRLG information of the links composing the main path.

203: When SRLG information of at least one link is different from the SRLG information of the links composing the main path, the second boundary node selects, according to the address of the second node and the SRLG information of the links composing the main path that are carried in the received request for establishing the backup path, a fourth link to built connection with the second node, consequently, the backup path between the first node and the second node is established; wherein, the SRLG information of the fourth link is different from the SRLG information of the links composing the main path.

In the present embodiment, the established backup path includes the third link, from the first node to the second boundary node, and the fourth link, from the second boundary node to the second node.

Optionally, in the implementation of the present embodiment, the SRLG information of the link may be recorded in Explicit Route Object (hereinafter referred to as ERO) information of the first node, the second node and the boundary node, for instance, adding and explicitly recording the SRLG information of a link using the current node as an egress and the identifier of the link in the ERO information.

In the embodiment of the present disclosure, after the main path is successfully established, the ERO information of the second node may be carried in the response message of successful establishment of the main path, which is returned to the first node from the second node, and the SRLG information of the link using the second node as an egress and the identifier information of corresponding link are recorded in the ERO information of the second node. Optionally, the ERO information of the boundary node may be carried in the above-mentioned response message, and the SRLG information of a link using the boundary node as an egress and the identifier information of the corresponding link are recorded in the ERO information of the boundary node.

To be clear, in the embodiment of the present disclosure, the number of links of the backup path is not required to be equal with the number of links of the main path.

In the present embodiment, the first node chooses the link (i.e. the third link in the embodiment) whose SRLG information is different from the links composing the main path to send the request for establishing the backup path to the second boundary node that bypasses the main path. The second boundary node chooses the link (i.e. the forth path in the embodiment) whose SRLG information are different from the links composing the main path to establish a connection with the second node, thereby realizing the establishment of a backup path between the first and second nodes. In this way, it can be ensured that the risk of failure of the main path between the first node and the second node is unequal with that of the backup path, which increases the safety of the backup path.

In some practical scenarios, backup paths have been established, but not all of the established backup paths are optimal. At this point, the backup path can be rebuilt according to the embodiment 1 or the embodiment 2 or the equivalent replacement ways of the embodiments 1 and 2 of the present disclosure. Preferably, in order to improve the efficiency of the establishment of the backup path and reduce the burden of network device, another embodiment of the present disclosure further provides a method for selecting backup path as well. In the embodiment, the established backup path is called the candidate backup path for distinguishment.

Figure 3:
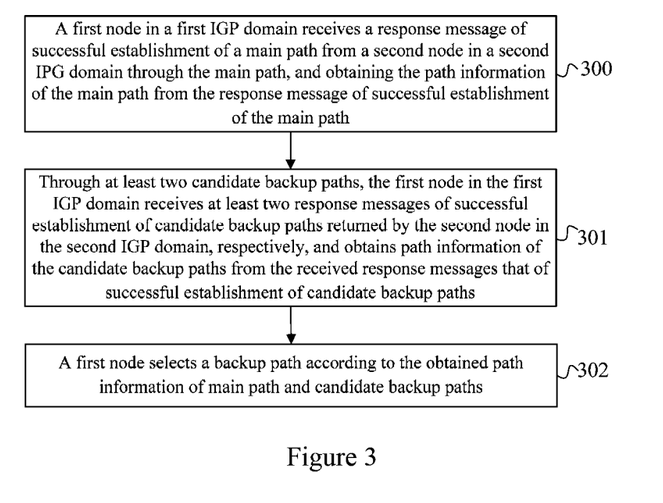
FIG. 3 is a flowchart of a method for establishing backup path provided by embodiment 3 of the present disclosure.

As shown in FIG. 3, the method for selecting backup path of present embodiment comprises:

300: A first node in a first IGP domain receives a response message of successful establishment of a main path from a second node in a second IPG domain through the main path, and obtaining the path information of the main path from the response message of successful establishment of the main path; wherein, the path information of this main path is carried in the response message of successful establishment of the main path returned from the main path, and the path information of the main path includes at least the SRLG information of a link composing the main path.

301: Through at least two candidate backup paths, the first node in the first IGP domain receives at least two response messages of successful establishment of candidate backup paths returned by the second node in the second IGP domain, respectively, and obtains path information of the candidate backup paths from the received response messages that of successful establishment of candidate backup paths; wherein, the path information of backup paths includes at least the SRLG information of the links composing the candidate backup paths.

The executing order of the above-mentioned 301 and 300 can be rearranged, namely, executing 301 first and then executing 300 or executing them at the same time.

302: A first node selects a backup path according to the obtained path information of main path and candidate backup paths; wherein, the SRLG information of the link composing the backup path is different from the SRLG information of the link composing the main path.

In the present embodiment, since the SRLG information of finally selected backup path is different from that of the main path, it can be ensured that the main path and the backup path don't have the same risk of failure.

Optionally, in the implementation of present embodiment, the SRLG information of the link is recorded in the Record Route Object (hereinafter referred to as RRO) information of the first, second and boundary node, for example, recording the SRLG information of the link using the current node as an egress and the identifier information of the link in the RRO information.

The method for selecting a backup path in the embodiment obtains the SRLG information of the link composing the main path and the SRLG information of the links composing the candidate backup paths, selects the best one of at least two candidate backup paths as the backup path. The best backup path can be selected under the cross-IGP domain scenario when the technical solutions in the embodiments of the present disclosure are adopted, which effectively reduces the risk of failure under the cross-IGP domain scenario, that is, reducing the probability of the risk that the backup path and the main path have the same failures to the bottom level, and thereby effectively improving the safety of user data.

Figure 4:
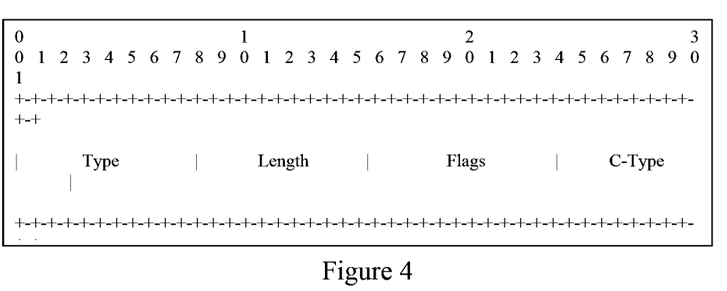
FIG. 4 is schematic drawing of an object of RRO or ERO of the present disclosure.

Optionally, in the above-mentioned embodiment, recording the SRLG information in RRO and ERO information can be realized by adding SRLG information to the object of ERO or the object of RRO in Resource Reservation Protocol traffic engineering (hereinafter referred to as RSVP-TE) message. The object of RRO or ERO shown in FIG. 4, the SRLG information can be carried in the contents of objects of the SRLG, using 4 bytes to identify.

Figure 5:
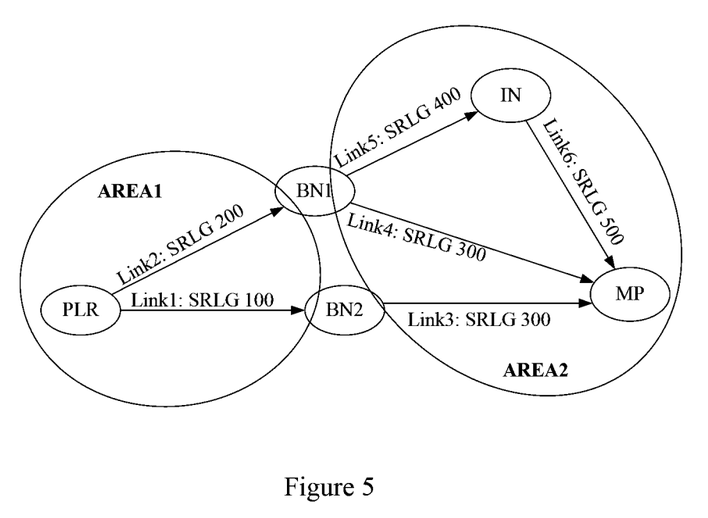
FIG. 5 is an example diagram of a specific application scenario of the present disclosure.

FIG. 5 is an example diagram of a specific application scenario of the present disclosure. As shown in FIG. 5, this scenario includes two neighboring IGP domains: Area1 and Area2, and the boundary nodes of these two neighboring IGP domains are BN1 and BN2. The SRLG information of links are: SRLG value of Link1 is 100, SRLG value of Link2 is 200, SRLG value of Link3 is 300, SRLG value of Link4 is 300, SRLG value of Link5 is 400 and SRLG value of Link6 is 500.

In the present scenario, the links which compose the main path between RLR and MP include: Link1 from PLR to BN2, Link2 from BN2 to the second node MP.

Supposing that no candidate backup paths have been established, the backup path can be established according to the method in the above-mentioned embodiment 1 or 2. For example, PLR receives a response message of successful establishment of a main path returned by the second node MP, and obtains the SRLG information of Link1 and Link3, which compose the link of the main path, and the address of the second node MP from the response message of successful establishment of the main path. Since the SRLG value of Link2 and that of Link1 is different, PLR sends, via Link2, a request for establishing a backup path to the boundary node BN1 which bypasses the main path.

According to the address of the second node MP and the SRLG information of the link composing the main path carried by the received request for establishing a backup path, the boundary node BN1 knows that the SRLG value of Link4 and the SRLG value of Link3 which composes the main path are the same, as a result, BN1 will not choose Link4 to set up a connection with the second node MR. The boundary node BN1 can choose Link5 to set up connection with node IN first, and then, set up connection from node IN to the second node MR via Link6. Therefore, the backup path to the second node MR established by PLR via boundary node BN1 and node IN is consist of Link2, Link5 and Link6. It can be seen, the SRLG value of Link2 is different from Link1 and Link3, the SRLG value of Link5 is different from Link1 and Link3, and the SRLG value of Link6 is also different from Link1 and Link3. Therefore the risk of failure of the backup path composed by Link2, Link5 and Link6 is definitely different from the main path composed by Link1 and Link3.

Supposing candidate backup paths are established in advance, the backup path can be selected according to the method in the above-mentioned embodiment 3. For example, supposing there are two candidate backup paths in the current scenario: a first candidate backup path composed by Link2 and Link4, a second candidate backup path composed by Link2, Link5 and Link6.

Wherein, since the SRLG value of Link4 is the same as that of Link3, the first candidate backup path cannot meet the requirement of a backup path. Whereas, the SRLG value of Link2 is different from that of Link1, and the SRLG values of Link5 and Link6 are both different from that of Link3. Therefore the second candidate backup path meets the requirement of backup path and the second candidate backup path can be selected as a backup path.

The method for establishing backup path and the method for selecting backup path in the present embodiment can establish/select the best backup path under the cross-IGP domain scenario, which effectively reduces the risk of failure under the cross-IGP domain scenario, that is, reducing the probability of the risk that the backup path and the main path have the same failures to the bottom level, and thereby effectively improving the safety of user data.

It should be appreciated for those skilled in the art that: the part of or all of the contents of the embodiments of realizing the above-mentioned method can be accomplished by the hardware related to the instructions of the hardware. The previous-mentioned program can be stored in a computer readable storage medium, and when the program is executing, the content including the embodiments of the method is executed. And the previous-mentioned storage medium includes: ROM, RAM, diskette or CD and many other kinds of mediums which are able to store program code.

Figure 6:
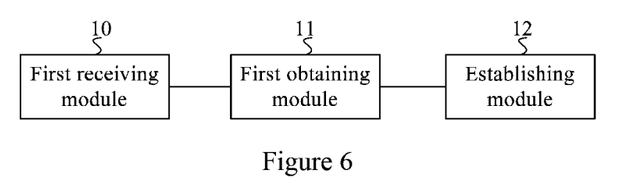
FIG. 6 is a structure diagram of a device for establishing backup path provided by embodiment 4 of the present disclosure.

FIG. 6 is a structure diagram of a device for establishing backup path provided by embodiment 4 of the present disclosure. As shown in FIG. 6, the device for establishing backup path of the embodiment can be a head node or a PLR and the device for establishing backup path locates in the first IGP domain. As shown in FIG. 6, the device for establishing of the embodiment backup path includes: a first receiving module 10, a first obtaining module 11 and an establishing module.

The first receiving module 10 is configured to receive a response message of successful establishment of a main path returned from a second node in a second IGP domain through the main path.

The first obtaining module 11, coupling with the first receiving module 10, is configured to obtain path information of the main path from the response message of successful establishment of the main path received by the first receiving module 10; where the path information of the main path includes at least the SRLG information of a link composing the main path.

The establishing module 12, coupling with the first obtaining module 11, is configured to establish, according to the path information of the main path obtained by the first obtaining module 11, a backup path between the device for establishing backup path and the second node, where the SRLG information of a link composing the backup path is different from the SRLG information of the link composing the main path.

The device for establishing backup path in the embodiment establishes the backup path according to the SRLG information of the link composing the main path; where the SRLG information of the link composing the backup path is different from the SRLG information of the link composing the main path. The best backup path can be obtained under the cross-IGP domain scenario when the technical solutions in the embodiments of the present disclosure are adopted, which resolves the problem that the backup path cannot be computed and obtained according to SRLG information under the cross-IGP domain scenario, effectively reduces the risk of failure under the cross-IGP domain scenario, reduces the probability of the risk that the backup path and the main path have the same failures to the bottom level, and thereby effectively improves the safety of user data.

Figure 7:
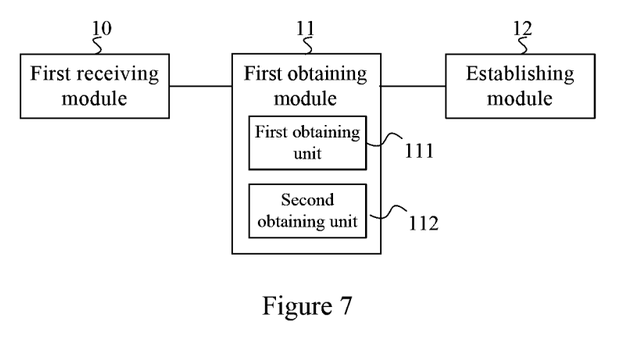
FIG. 7 is another structure diagram of a device for establishing backup path provided by embodiment 4 of the present disclosure.

Optionally, as shown in FIG. 7, the first obtaining module 11 comprises:
a first obtaining unit 111, configured to obtain the SRLG information of the link composing the main path, from the response message of successful establishment of the main path;
a second obtaining unit 112, configured to obtain address of the second node from the response message of successful establishment of the main path.

Figure 8:
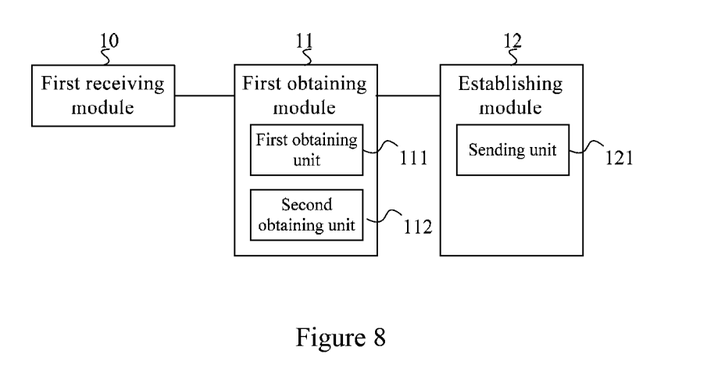
FIG. 8 is another structure diagram of a device for establishing backup path provided by embodiment 4 of the present disclosure.

Optionally, as shown in FIG. 8, the establishing module 12 comprises:
a sending unit 121, configured to send, via a first link, a request for establishing a backup path to a second boundary node which bypasses the main path, so that the second boundary node chooses a second link to establish a connection with the second node according to the received request for establishing the backup path, where the address of the second node and the SRLG information of the link composing the main path are carried in the request for establishing the backup path. The SRLG information of the first link is different from the SRLG information of the link composing the main path, and the SRLG information of the second link is different from the SRLG information of the link composing the main path.

Figure 9:
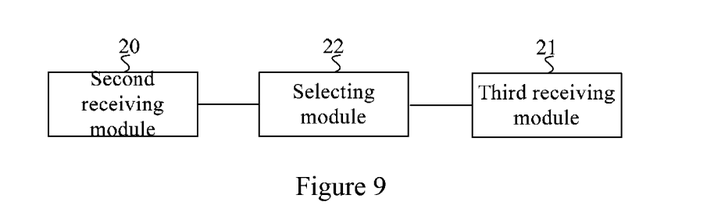
FIG. 9 is a structure diagram of a device for selecting backup path provided by embodiment 5 of the present disclosure.

FIG. 9 is a structure diagram of a device for selecting backup path provided by embodiment 5 of the present disclosure. The device for selecting backup path of the embodiment of the present disclosure locates in a first IGP domain specifically. As shown in FIG. 9, the device for selecting backup path of the present embodiment includes a second receiving module 20, a third receiving module 21 and a selecting module 22.

The second receiving module 20, is configured to receive a response message of successful establishment of the main path returned from a second node in a second IGP domain through the main path, and obtain path information of the main path from the response message of successful establishment of the main path; where, the second IGP domain is a neighbor of the first IGP domain.

The third receiving module 21, is configured to receive, through at least two candidate backup paths, at least two response messages of successful establishment of candidate backup paths returned by the second node, respectively, and obtain path information of the candidate backup paths from the response message of successful establishment of the candidate backup paths.

The selecting module 22, coupling with the second receiving module 20 and the third receiving module 21, is configured to select a backup path according to the path information of the main path obtained by the second receiving module 20 and the path information of the candidate backup paths obtained by the third receiving module 21, wherein the SRLG information of a link composing the backup path is different from the SRLG information of a link composing the main path.

The device for selecting a backup path in the embodiment selects the best path from at least two candidate paths as the backup path through obtaining the SRLG information of the link composing the main path. The best backup path can be obtained under the cross-IGP domain scenario when the technical solutions in the embodiments of the present disclosure are adopted, which effectively reduces the risk of failure under the cross-IGP domain scenario, that is, reducing the probability of the risk that the backup path and the main path have the same failures to the bottom level, and thereby effectively improving the safety of user data.

The above-described apparatus/device is merely schematic, wherein, the units that illustrated as detached components can be physically separated or not, and the components displayed as a unit can be a physical unit or not, namely, can be located in one place or can be distributed at least two network units. Part of or all of the modules can be chosen, according to the practical demand, to realize the objective of the solutions of the present embodiment. The embodiments can be understood and implemented by those skilled in the art without any inventive efforts.

It should be appreciated for those skilled in the art that: the part of or all of the contents of the embodiments of realizing the above-mentioned method can be accomplished by the hardware related to the instructions of the hardware. The previous-mentioned program can be stored in a computer readable storage medium, and when the program is executing, the content including the embodiments of the method is executed. And the previous-mentioned storage medium includes: ROM, RAM, diskette or CD and many other kinds of mediums which are able to store program code.

It is to be noted that the above embodiments are only some embodiments of the present disclosure and gives no limit to the present disclosure. Although a detailed illustration to the present disclosure is given referring to the above mentioned embodiments, it should be appreciated for those skilled in the art that the technical solutions recorded in the embodiments described above can still be modified, or e parts of the technical features thereof can be replaced. Such modifications and replacements will not make the nature of the corresponding technical solutions depart from the spirit and scope of the embodiments of the present disclosure.

What is claimed is:
1. A method for establishing a backup path, comprising:
receiving, by a first node in a first internal gateway protocol domain, a response message of successful establishment of a main path returned by a second node in a second internal gateway protocol domain through the main path, wherein the second internal gateway protocol domain is a neighbor of the first internal gateway protocol domain and shared risk link groups information of links in the first internal gateway protocol domain is different from that of links in the second internal gateway protocol domain;
obtaining, by the first node, path information of the main path from the response message of successful establishment of the main path, wherein the path information of the main path includes at least shared risk link groups information of a link composing the main path; and establishing, by the first node, a backup path between the first node and the second node according to the path information of the main path, wherein the shared risk link groups information of a link composing the backup path is different from the shared risk link groups information of the link composing the main path in both the first internal gateway protocol domain and the second internal gateway protocol domain;

wherein the path information of the main path further includes an address of the second node;

wherein establishing, by the first node, a backup path between the first node and the second node according to the path information of the main path, comprises:

sending, by the first node, via a first link, a request for establishing a backup path to a second boundary node which bypasses the main path when shared risk link groups information of at least one link is different from the shared risk link groups information of the link composing the main path, so that the second boundary node chooses a second link to establish a connection with the second node according to the received request for establishing the backup path and establishes the backup path between the first node and the second node;

wherein the address of the second node and the shared risk link groups information of the link composing the main path are carried in the request for establishing the backup path, the shared risk link groups information of the first link is different from the shared risk link groups information of the link composing the main path, and the shared risk link groups information of the second link is different from the shared risk link groups information of the link composing the main path.

2. The method according to claim 1, wherein the shared risk link groups information of the link composing the main path is recorded in explicit route object information.

3. The method according to claim 1, wherein the shared risk link groups information of the link composing the main path is recorded in record route object information.

4. A method for selecting a backup path, comprising:

receiving, by a first node in a first internal gateway protocol domain, a response message of successful establishment of a main path returned by a second node in a second internal gateway protocol domain through the main path, and obtaining path information of the main path from the response message of successful establishment of the main path, and shared risk link groups information of links in the first internal gateway protocol domain is different from that of links in the second internal gateway protocol domain;

wherein the path information of the main path further includes an address of the second node;

sending, by the first node, via a first link, a request for establishing backup path to a second boundary node which bypasses the main path, so that the second boundary node chooses a second link to establish a connection with the second node according to the received request for establishing the backup path, wherein the address of the second node and the shared risk link groups information of the link composing the main path are carried in the request for establishing the backup path, the shared risk link groups information of the first link is different from the shared risk link groups information of the link composing the main path, and the shared risk link groups information of the second link is different from the shared risk link groups information of the link composing the main path;

receiving, by the first node, through at least two candidate backup paths, at least two response messages of successful establishment of candidate backup paths returned by the second node, respectively, and obtaining path information of the candidate backup paths from the response messages of successful establishment of the candidate backup paths; and selecting, by the first node, a backup path according to the obtained path information of the main path and the path information of the candidate backup paths, wherein the shared risk link groups information of a link composing the backup path is different from the shared risk link groups information of a link composing the main path in both the first internal gateway protocol domain and the second internal gateway protocol domain.

5. The method according to claim 4, wherein, the shared risk link groups information of the link composing the main path is recorded in one of explicit route object information and record route object information; and the shared risk link groups information of the link composing the candidate backup paths is one of explicit route object information and record route object information.

6. A computer-readable storage device, wherein the device stores a set of instructions for establishing a backup path located in a first internal gateway protocol domain the instructions may be executed to:

receive a response message of successful establishment of a main path returned by a second node in a second internal gateway protocol domain through the main path, wherein the second internal gateway protocol domain is a neighbor of the first internal gateway protocol domain and shared risk link groups information of links in the first internal gateway protocol domain is different from that of links in the second internal gateway protocol domain;

obtain path information of the main path from the response message of successful establishment of the main path, wherein the path information of the main path includes at least shared risk link groups information of a link composing the main path; and establish, according to the path information of the main path, a backup path between the device for establishing backup path and the second node, wherein the shared risk link groups information of a link composing the backup path is different from the shared risk link groups information of the link composing the main path in both the first internal gateway protocol domain and the second internal gateway protocol domain;

obtain an address of the second node from the response message of successful establishment of the main path;

send, via a first link, a request for establishing the backup path to a second boundary node which bypasses the main path, so that the second boundary node chooses a second link to establish a connection with the second node according to the received request for establishing the backup path, wherein the address of the second node and the shared risk link groups information of the link composing the main path are carried in the request for establishing the backup path, the shared risk link groups information of the first link is different from the shared risk link groups information of the link composing the main path, and the shared risk link groups information of the second link is different from the shared risk link groups information of the link composing the main path.

7. The computer-readable storage device according to claim 6, wherein the device further stores instructions that may be executed to:

obtain the shared risk link groups information of the link composing the main path, from the response message of successful establishment of the main path.

8. A computer-readable storage device, wherein the device stores a set of instructions for selecting a backup path located in a first internal gateway protocol domain the instructions may be executed to:

receive a response message of successful establishment of a main path, from a second node in a second internal gateway protocol domain through the main path, mad obtain path information of the main path from the response message of successful establishment of the main path, wherein the second internal gateway protocol domain is a neighbor of the first internal gateway protocol domain and shared risk link groups information of links in the first internal gateway protocol domain is different from that of links in the second internal gateway protocol domain;

wherein the path information of the main path further includes an address of the second node;

send, via a first link, a request for establishing backup path to a second boundary node which bypasses the main path, so that the second boundary node chooses a second link to establish a connection with the second node according to the received request for establishing the backup path, wherein the address of the second node and the shared risk link groups information of the link composing the main path are carried in the request for establishing the backup path, the shared risk link groups information of the first link is different from the shared risk link groups information of the link composing the main path, and the shared risk link groups information of the second link is different from the shared risk link groups information of the link composing the main path;

receive, through at least two candidate backup paths, at least two response messages of successful establishment of candidate backup paths returned by the second node, respectively, and obtain path information of the candidate backup paths from the response messages of successful establishment of the candidate backup paths; and select a backup path according to the path information of the main path and the path information of the candidate backup paths wherein the shared risk link groups information of a link composing the backup path is different from the shared risk link groups information of a link composing the main path in both the first internal gateway protocol domain and the second internal gateway protocol domain.

* * * * *

UNITED STATES PATENT AND TRADEMARK OFFICE
CERTIFICATE OF CORRECTION

PATENT NO. : 9,112,775 B2  
APPLICATION NO. : 13/925234  
DATED : August 18, 2015  
INVENTOR(S) : Liu et al.

Page 1 of 1

It is certified that error appears in the above-identified patent and that said Letters Patent is hereby corrected as shown below:

In the Claims:

Column 13, line 10, "mad" should read -- and --.

Signed and Sealed this  
Eighth Day of March, 2016

Michelle K. Lee  
*Director of the United States Patent and Trademark Office*